United States Patent [19]

Peiffer et al.

[11] Patent Number: 5,451,455
[45] Date of Patent: Sep. 19, 1995

[54] BIAXIALLY ORIENTED POLYPROPYLENE FILM SUITABLE FOR TWIST WRAPPING

[75] Inventors: Herbert Peiffer, Mainz-Finthen; Ursula Murschall, Nierstein; Gunter Schloegl, Kelkheim, all of Germany

[73] Assignee: Hoechst Aktiengesellschaft, Frankfurt am Main, Germany

[21] Appl. No.: 137,496

[22] Filed: Oct. 15, 1993

Related U.S. Application Data

[63] Continuation of Ser. No. 769,222, Oct. 1, 1991, abandoned.

[30] Foreign Application Priority Data

Oct. 2, 1990 [DE] Germany ............... 40 31 125.2

[51] Int. Cl.⁶ .................. B32B 27/32; B32B 31/28; B32B 31/30
[52] U.S. Cl. ..................... 428/323; 428/331; 428/336; 428/516; 428/910
[58] Field of Search ............. 428/323, 331, 336, 516, 428/910

[56] References Cited

U.S. PATENT DOCUMENTS 4,595,625  6/1986  Crass et al. ............... 428/215
4,786,533  11/1988  Crass et al. ............... 428/13
4,921,749  5/1990  Bossaert et al. ............ 428/216

FOREIGN PATENT DOCUMENTS 0317276  5/1989  European Pat. Off. .
0432452  6/1991  European Pat. Off. .
3735272  4/1988  Germany .
1231861  5/1971  United Kingdom .

*Primary Examiner*—D. S. Nakarani
*Attorney, Agent, or Firm*—Foley & Lardner

[57] ABSTRACT

A multilayered, highly transparent, biaxially oriented, polypropylene film having excellent twist properties, which is particularly suited for twist wrapping comprising a base layer which contains about 70 to about 95% by weight polypropylene and about 5 to about 30% by weight based on the layer of a low-molecular hydrocarbon resin having a softening point of about 130 to about 180° C., and at least one additional layer which optionally comprises an anti-blocking agent having an average particle size of about 2 to about 5 μm and optionally further comprises a polydimethylsiloxane. The films have high mechanical strength values, which are about the same both in the longitudinal and in the transverse directions, and a balanced orientation. A process for producing the film is also provided.

20 Claims, 1 Drawing Sheet

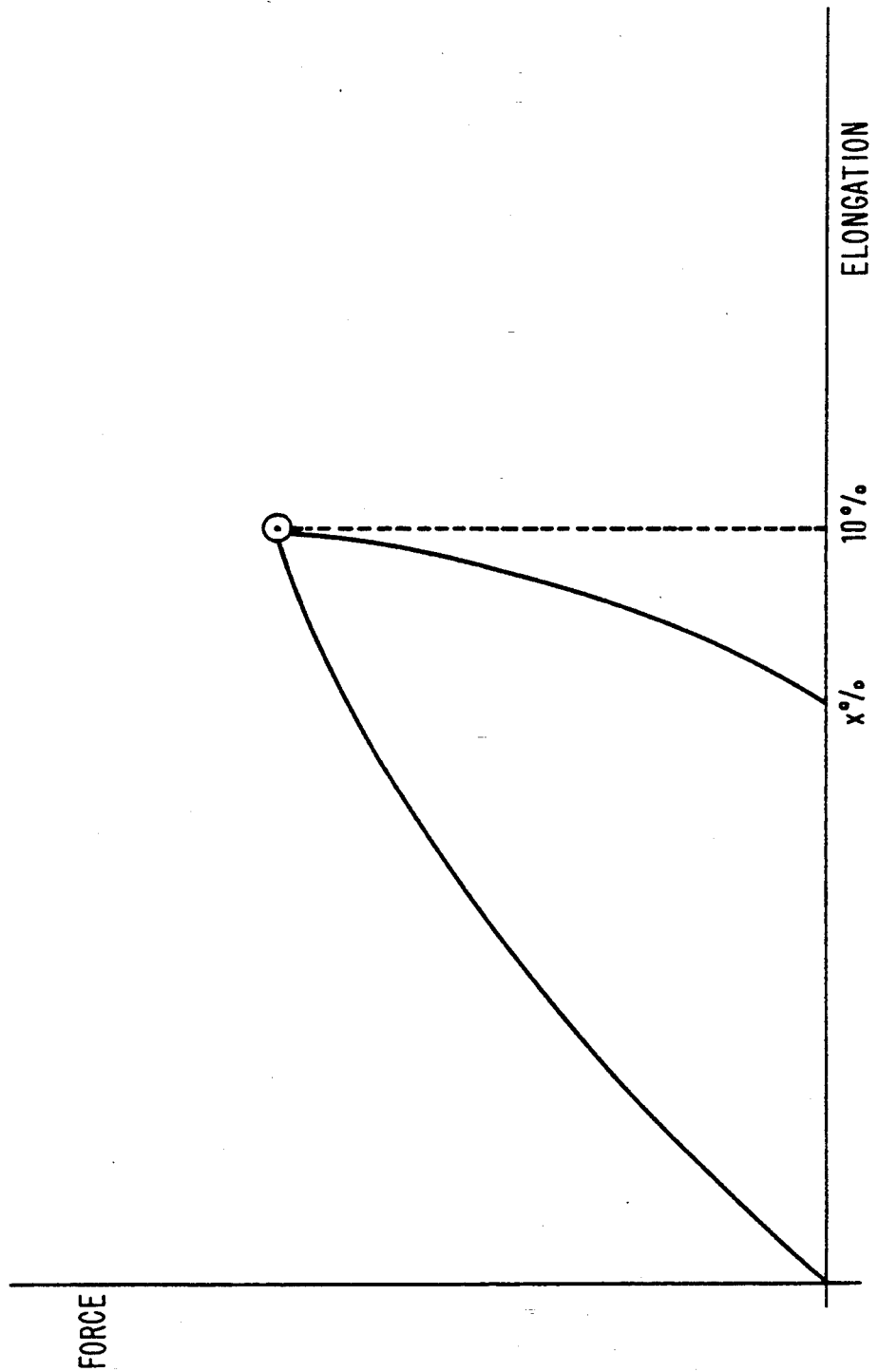

BIAXIALLY ORIENTED POLYPROPYLENE FILM SUITABLE FOR TWIST WRAPPING

This application is a continuation of application Ser. No. 07/769,222, filed Oct. 1, 1991 now abandoned.

BACKGROUND OF THE INVENTION

The present invention relates to a multilayered highly transparent biaxially oriented polypropylene film having excellent twist properties, which is suited, in particular, for twist wrapping. The invention is also directed to a process for producing such films and to their use.

Polypropylene (PP) films distinguished by good twist properties are known. For example, GB-A-1,231,861 discloses a biaxially oriented polypropylene (boPP) film which is produced by means of the bubble process and which can be readily twisted. Twistability is imparted to the film by adding to the PP homopolymer a low molecular weight hydrocarbon resin and by orientating the film in the machine direction. To facilitate processing on high-speed wrapping machines, the film additionally comprises an antistatic agent. Due to its principal orientation in the longitudinal direction, the film tends to split during the wrapping, for example, of candies, i.e, the twirled end may tear off at the twisting point. Furthermore, the film has unsatisfactory running properties on high-speed wrapping machines, and the optical properties and the shrink of the film are not completely satisfactory.

Moreover, the process for producing a film having a predominant orientation in the longitudinal direction, as described in the above publication, is very complicated, requiring balanced orientation by means of bubble process and subsequent stretching/shrinking in an off-line process. This makes the film relatively expensive.

DE-A-35 35 472 also relates to a film which is well suited for twist wrapping. By the addition of siloxanes and anti-blocking agents to the top layers, the desired favorable processing properties on automated high-speed twist-wrapping machines are imparted to the film. A disadvantage of these films is that relatively high resin contents are required for good twistability. Exemplary contents of 25% are mentioned. This drastically increases the price of the film. If the resin content of the above film is reduced, the required twisting properties are not achieved. Moreover, the film does not, in all cases, meet the desired standards with respect to shrinkage and optical properties.

EP-A-317,276 relates to a film for twist wrapping. Due to the stretching parameters indicated ($\lambda_l = 3.5$, $\lambda_t = 9$–10), the film is more highly oriented in the transverse direction. Films of this type leave much to be desired with respect to their twisting properties.

SUMMARY OF THE INVENTION

It is therefore an object of the instant invention to provide a multilayered, coextruded, highly transparent, biaxially oriented polypropylene film which has good twisting properties and is suitable for twist wrapping, and which can be produced in a more cost-saving manner than the films of this generic type presently known, and which additionally is distinguished by good optical properties and low shrink values. The films of the invention are furthermore distinguished by good mechanical properties, with the strength values being about the same in the longitudinal and in the transverse direction, i.e., the film has a balanced orientation.

This object is accomplished by providing a biaxially oriented, transparent, multilayered film comprising:

(a) a base layer comprising a mixture of a propylene polymer and a low molecular weight resin having a softening point between about 130° to about 180° C., and (b) at least one additional layer comprising a material which can be readily subjected to corona treatment.

It is also an object of the invention to provide a process for producing the above film.

In accordance with this object there is provided, a process comprising the steps of:

(i) coextruding through a slot die the individual layers of the film so as to produce a multilayer film, (ii) solidifying said multilayer film by chilling, and (iii) orienting said multilayer film by stretching in the longitudinal and transverse directions, such that the film is imparted with isotropic properties in each direction.

Further objects, features and advantages of the present invention will become apparent from the detailed description of preferred embodiments that follows.

BRIEF DESCRIPTION OF THE DRAWINGS

FIG. 1 is a chart showing permanent elongation percentage as a function of force as used to evaluate the exemplified films.

DETAILED DESCRIPTION OF THE PREFERRED EMBODIMENTS

The polypropylene preferably employed in the base layer is an isotactic propylene homopolymer or a copolymer which is predominantly composed of propylene units. Such polymers preferably have a melting point of not less than about 140° C., and more preferably of not less than about 150° C. Isotactic polypropylene having an n-heptane-soluble fraction of less than about 15% by weight, copolymers of ethylene and propylene having an ethylene content of less than about 10% by weight, and copolymers of propylene with other alpha-olefins of 4 to 8 carbon atoms and containing less than about 10% by weight of these alpha-olefins are typical examples of the preferred thermoplastic polypropylene of the base layer.

The preferred thermoplastic polypropylene polymers have a melt flow index in the range of about 0.5 g/10 min. to about 8 g/10 min. at 230° C. and 2.16 kg load (DIN 53,735 corresponding to ASTM-D 1238), and more preferably from about 1.0 g/10 min. to about 5 g/10 min.

The low molecular weight resin contained in the base layer is any natural or synthetic resin, preferably having a softening point of about 130° to about 180° C., more preferably of about 140° to about 160° C. (determined according to DIN 1995-U 4), and preferably having a molecular weight of 200 to 1,000. Among the numerous low molecular weight resins, hydrocarbon resins are preferred, in particular, petroleum resins, styrene resins, cyclopentadiene resins, and terpene resins (these resins are described in *Ullmanns Enzyklopaedie der Techn. Chemie* (Ullmann's Encyclopedia of Industrial Chemistry), 4th edition, volume 12, pages 525 to 555.

The petroleum resins are hydrocarbon resins which are prepared by polymerization of deep-decomposed petroleum materials in the presence of a catalyst. These petroleum materials usually contain a mixture of resin-forming substances such as styrene, methylstyrene, vinyltoluene, indene, methylindene, butadiene, isoprene, piperylene, and pentylene.

The styrene resins are low molecular weight homopolymers of styrene or copolymers of styrene with other monomers, such as alpha-methyl-styrene, vinyltoluene, and/or butadiene. The cyclopentadiene resins are cyclopentadiene homopolymers or cyclopentadiene copolymers which are obtained from coal-tar distillates and fractionated natural gas. These resins are prepared by keeping the cyclopentadiene-containing materials at a high temperature for a long period. Dimers, trimers, or oligomers can be obtained, depending on the reaction temperature.

The terpene resins are polymers of terpenes, i.e., of hydrocarbons of the formula $C_{10}H_{16}$, which are present in almost all ethereal oils or oil-containing resins in plants, and phenol-modified terpene resins. Alphapinene, $\beta$-pinene, dipentene, limonene, myrcene, camphene, and similar terpenes may be mentioned as specific examples of the terpenes. The hydrocarbon resins can also be so-called modified hydrocarbon resins. Preferably, modification is effected by reaction of the raw materials before polymerization, by introduction of special monomers, or by reaction of the polymerized product, with hydrogenations or partial hydrogenations, in particular, being performed.

Preferred hydrocarbon resins employed include sytrene homopolymers, styrene copolymers, cyclopentadiene homopolymers, cyclopentadiene copolymers and/or terpene polymers having, in each case, a softening point of 130° to 180° C., preferably of 140° to 160° C. In the case of the unsaturated polymers, the hydrogenated product is particularly preferred.

The low molecular weight resin is added to the base layer in an amount effective to improve the mechanical properties of the film. The preferred amount of low molecular weight resin is about 5 to about 30% by weight, and more preferably about 10 to about 25% by weight, based on the total weight of polypropylene and low molecular weight resin.

By the addition of a low molecular weight resin the mechanical properties of the film, such as modulus of elasticity and tear resistance, are improved. Furthermore, the elongation at break is clearly reduced by the resin addition, i.e., the film becomes brittle. This is a property desirable for twist wrapping.

It is advantageous to use as the low molecular weight resin, a resin having a high softening temperature, preferably of more than about 140° C. Thus, stretching in the transverse direction can be performed at a higher temperature, which reduces the shrink of the film. Low shrink values are desirable, since otherwise, the film may lose its flatness when it is dried at elevated temperatures following printing. Moreover, the twisting properties are impaired as a result of film shrinkage. When a resin having the indicated high softening temperature is used, stretching can be performed at a preferred temperature of about 140° to about 150° C. However, if a resin having a lower softening temperature of, e.g., 120° C., is stretched at these high temperatures, it will lose its clearity and transparency.

The additional layers preferably comprise two layers, one on either side of the base layer. Preferably, the additional layers are the two outer layers of the film.

Like the base layer, the additional layer or layers may be comprised of a propylene homopolymer or of a copolymer including a predominant proportion of propylene units. Polymers of this kind preferably have a melting point of at least about 140° C., more preferably of at least about 150° C. Isotactic polypropylene having a fraction soluble in n-heptane of less than about 15% by weight, copolymers of ethylene and propylene having an ethylene content of less than about 10% by weight, and copolymers of propylene and other alpha-olefins having 4 to 8 carbon atoms, where the content of these alpha-olefins is less than 10%, are typical examples of preferably employed thermoplastic polypropylene.

The preferred thermoplastic polypropylene polymers of the additional layer(s) have a melt flow index of about 0.5 g/10 min. to about 8 g/10 min., most preferably of about 1.5 g/10 min. to about 4 g/10 min., each measured at 230° C. and under a load of 2.16 kg (DIN 53 735).

In order to improve certain properties of a film, the base layer as well as the cover layer(s) may contain customary additives in usual amounts, which do not otherwise negatively effect the desired film properties.

An anti-blocking agent may be added to one or more of the additional layers. Preferably the anti-blocking agent has a particle size of about 2 to about 5 $\mu$m. Silica is a preferred anti-blocking agent.

A polydialkylsiloxane may be added to one or more of the additional layers as an additive. A preferred polydiorganosiloxane is a polydialkylsiloxane having 1 to 4 carbon atoms in its alkyl group, with polydimethylsiloxane being particularly preferred. The polydialkylsiloxane preferably has a kinematic viscosity of about 1,000 to about 100,000 mm$^2$/s, more preferably of about 5,000 to about 50,000 mm$^2$/s, measured at 25° C. The amount of polydialkylsiloxane employed in the additional layer or additional layers is preferably about 0.2 to 1.5% by weight, more preferably about 0.3 to about 1.0% by weight, relative to the weight of the additional layer comprising the additive. The thickness of the additional layer is preferably as small as possible. The thicker the layers are, the poorer is the twistability of the film. Accordingly, the layer thickness should preferably be less than about 0.5 $\mu$m, most preferably between about 0.3 and about 0.4 $\mu$m.

The low molecular weight resin described above in connection with the base resin may also be present in one or more of the additional layers. This in particular improves the optical properties of the film. These resins may be present in any amount which provides the desired improved properties, preferably about 5 to 30% by weight based on the additional layer's weight.

The multilayered film of the invention may be produced by any known process. A preferred process of the invention comprises first producing a cast film by coextrusion through a slot die, solidifying said cast film by passing it over a chill roller, and then orienting it by stretching in the longitudinal and transverse directions. The conditions for stretching in the longitudinal and transverse directions are chosen such that the stretched film has isotropic properties in both directions, i.e., the stretched film possesses a balanced orientation. A balanced orientation is generally a prerequisite for obtaining excellent twisting properties. Furthermore, it has been found that the twistability of the film is favorably influenced by the longitudinal stretch factor. In accordance with this invention, the stretch ratio in the longitudinal direction is preferably about 6 to about 9, more preferably about 6.5 to about 8.0. The stretch ratio in the transverse direction must be matched to the stretch ratio in the longitudinal direction. A range of between about 6.5 to about 8.0 has been found to be adequate. Unlike other packaging films, it is generally not expedient to choose a high degree of stretching in the transverse direction. If, for example, the longitudinal stretch ratio $\lambda_l$ is 5 and the transverse stretch ratio $\lambda_t$ is 10, the twistability of the resulting film is poor, even if large amounts of resin are added.

The twistability of a film can be characterized with the aid of two physical quantities. The greater the permanent deformation in the longitudinal and in the transverse directions, (for method of measurement see Examples) and the smaller the elongation at break in the longitudinal direction, the higher is the twistability. The above quantities should assume about the same values in both directions. A good twist can be achieved when the values for the permanent deformation are greater than about 60% in both directions.

The elongation at break is determined in accordance with DIN 53 455, as are the modulus of elasticity, and the tensile strength. The values for the elongation at break of the films according to this invention are preferably less than 100%, more preferably, less than 90%, in both directions. Their mutual difference should preferably not be more than about 10%.

Surprisingly, the optical properties of the films according to this invention are excellent. Their gloss preferably is more than about 110, more preferably of more than about 120, measured according to DIN 67,530, at an angle of 20°. Their haze is preferably less than about 2%, determined in accordance with Gardner (ASTM-D 1003-52).

The shrink level of the film is measured after storage of the film in a circulating air cabinet at 120° C. for 15 minutes.

Easy printability of the film is achieved by subjecting the film to any of the conventional surface treatments prior to winding, such as a flame treatment or an electrical corona discharge treatment. Corona treatment employing any of the conventional methods is expediently carried out by passing the film between two conductor elements serving as electrodes, whereby a voltage, generally an alternating voltage, sufficiently high, generally about 10,000 V and 10,000 Hz, to effect spray or corona discharges is applied between the electrodes. Due to these spray or corona discharges the air above the film surface is ionized and combines with the molecules on the film surface, so that polar inclusions are formed in the essentially non-polar polymer matrix.

The treatment intensities are within the usual limits. Preference is given to intensities between about 38 and about 42 mN/m.

The invention is further illustrated by the following examples without being limited thereby.

EXAMPLE 1

A three-layered film having a total thickness of 25 μm is produced by coextrusion and subsequent stepwise orientation in the longitudinal and transverse directions. The two outside layers each have a thickness of 0.4 μm. The compositions of the layers are as follows:

A: Base layer 71.6% by weight of isotactic polypropylene,
28.0% by weight of hydrogenated cyclopentadiene resin having a softening temperature of 140° C.,
0.2% by weight of N,N-bis-ethoxyalkylamine, and
0.2% by weight of erucic acid amide.
The melt flow index of the mixture is:
$I_2 = 10$ g/10 min. or
$I_5 = 50$ g/10 min.

B: Each outside layer 99.2% by weight of a random ethylene/propylene copolymer having a $C_2$ content 4.5%,
0.3% by weight of $SiO_2$ having an average particle size of 3 μm, as an antiblocking agent, and
0.5% by weight of a polydimethylsiloxane having a viscosity of 30,000 mm$^2$/s.
The melt flow index of each outside layer is:
$I_2 = 12$ g/10 min or
$I_5 = 60$ g/10 min
The film is produced under the following conditions:

| Extrusion: | Temperature of layer A: 190° C. |
| --- | --- |
| | Temperature of layers B: 270° C. |
| | Temperature of chill roller: 30° C. |
| Longit. stretching: | Temperature = 110° C. |
| | Stretch ratio = 6.5 |
| Transv. stretching: | Temperature = 150° C. |
| | Stretch ratio = 7.3 |
| | Convergence = 25% |
| Heat setting: | Temperature = 110° C. |

The properties of the film produced in this way are compiled in the Table below. Prior to winding, the film is subjected to a corona treatment in order to ensure its printability. Due to this treatment, the film has a surface tension of 40 mN/m.

EXAMPLE 2

A three-layered film having a total thickness of 25 μm with outside layers each having a thickness of 0.4 μm is produced as described in Example 1, with the exception that the resin content in the base layer is adjusted to 20% by weight. The extrusion temperatures are the same as in Example 1. Due to the lower resin content, the conditions for the longitudinal and transverse stretching are changed as follows:

| Longit. stretching: | Temperature = 115° C. |
| --- | --- |
| | Stretch ratio = 7.2 |
| Transv. stretching: | Temperature = 152° C. |
| | Stretch ratio = 7.2 |
| | Convergence 20% |

The properties of the resulting film are also compiled in the Table below.

EXAMPLE 3

A film is produced as in Examples 1 and 2, except that the resin content is reduced to 15% by weight. The stretching conditions are as follows:

| Longit. stretching: | Temperature = 120° C. |
| --- | --- |
| | Stretch ratio = 7.7 |
| Transv. stretching: | Temperature = 153° C. |
| | Stretch ratio = 7.2 |

EXAMPLE 4

A film is produced as in Example 1, except that the outside layers comprise polypropylene with 20% (relative to the total weight of the top layers) of the low molecular weight resin. As can be seen from the Table below, the permanent elongation and especially the optical properties are improved.

Comparative Example 1

A film is prepared in accordance with Example 1, with the exception that the softening temperature of the resin is 120° C. The table reveals that this, in particular, impairs the optical properties and the shrink behavior of the film.

Comparative Example 2

A film is produced in accordance with Example 1, with the exception that the film is not subjected to a "balanced" orientation, but to a "conventional" orientation. The resin content of the base layer is 25%. The stretching conditions are as follows:

| Longit. stretching: | Temperature = 110° C. |
| --- | --- |
|  | Stretch ratio = 5.5 |
| Transv. stretching: | Temperature = 150° C. |
|  | Stretch ratio = 10 |

Although the moduli of elasticity are more than 3,000 N/mm² in both directions and although the resin content is 25%, the twist properties are very poor.

Comparative Example 3

A film containing 20% by weight of low molecular weight resin in its base layer is produced in accordance with Example 1. The top layers have a thickness of 0.8 μm each. The Table shows that the twist behavior and the optical properties of the resulting film are inferior to those of the film according to the invention.

Evaluation

The twist behavior (last column of the Table) of the films is evaluated by running tests on candy wrapping machines. The tests are carried out on a low-speed wrapping machine (500 cycles/1 minute, available from Messrs. Haensel) and on a high-speed wrapping machine (1,200 cycles/1 minute, available from Messrs. Nagema). The properties tested are the undesired untwisting of twisted candy wrappers, i.e., without external influence, the untwisting behavior of candies during unwrapping, and the degree of filling of candy bags of identical sizes. Evaluation of the properties measured is carried out as follows:

Determination of the permanent elongation

A 15 mm wide strip of film is cut off from the film perpendicularly to the machine direction and clamped into a tensile strength tester, with the clamping length being 200 mm. The sample is stretched at a rate of 20 mm/min, i.e., of 10%/min. When an elongation of 10% is achieved, i.e., when the clamping length of the sample is 220 mm, the sample is de-tensioned at the same rate. The determination of the permanent elongation is shown diagrammatically in the attached FIG. I. The permanent elongation ($E_p$) is calculated as follows:

$$E_p = \frac{X\%}{10\%} \times 100\%$$

The quality of the twist is judged as follows:
++ = very good
° = moderate
-- = insufficient

TABLE

| Example No. | Perm. elong. longit./transv. % | | Modulus of elast. longit./transv. N/mm² | | Tear strength longit./transv. N/mm² | | Elong. at break longit./transv. % | | Shrink longit./transv. % | | Gloss | Haze % | Quality of twist |
| --- | --- | --- | --- | --- | --- | --- | --- | --- | --- | --- | --- | --- | --- |
| 1 | 61 | 62 | 3200 | 3400 | 205 | 215 | 95 | 78 | 11 | 7 | 118 | 1.5 | ++ |
| 2 | 63 | 65 | 3500 | 3700 | 225 | 210 | 85 | 90 | 8 | 5 | 115 | 1.6 | ++ |
| 3 | 62 | 62 | 3250 | 3300 | 215 | 210 | 80 | 85 | 6 | 3 | 113 | 1.7 | ++ |
| 4 | 62 | 63 | 3300 | 3400 | 210 | 210 | 90 | 80 | 11 | 8 | 123 | 1.4 | ++ |
| C1 | 61 | 61 | 3150 | 3400 | 200 | 210 | 100 | 82 | 13 | 10 | 110 | 2.0 | ++ |
| C2 | 63 | 47 | 3050 | 4700 | 190 | 360 | 120 | 50 | 18 | 12 | 117 | 1.5 | — |
| C3 | 59 | 57 | 3100 | 3400 | 195 | 220 | 105 | 85 | 12 | 8 | 105 | 2.3 | ° |

What is claimed is:

1. A biaxially oriented, transparent, multilayered film which is suitable for twist wrapping comprising:
   a) a base layer comprising a mixture of a polypropylene polymer and a resin having a softening point of about 130° to about 180° C., and
   b) at least one additional layer comprising a material which can be readily subjected to corona treatment,
   wherein said multilayered film is prepared using matched stretch ratios in the transverse and longitudinal direction such that the film has a permanent deformation in the longitudinal direction of greater than about 60% and has a permanent deformation in the transverse direction of greater than about 60%, wherein the film has a substantially balanced orientation.

2. A biaxially oriented film as claimed in claim 1, wherein the elongation at break of the film is isotropic and is less than 100%, both in the machine direction and in the direction extending perpendicularly thereto.

3. A biaxially oriented film as claimed in claim 1, comprising about 5 to about 30% by weight of said resin and about 70 to 95% of said propylene polymer, the percentages each based on the total weight of said propylene polymer and said resin present in said base layer.

4. A biaxially oriented film as claimed in claim 1, wherein said propylene polymer comprises at least 90% by weight of propylene, based on the total weight of said propylene polymer.

5. A biaxially oriented film as claimed in claim 4, wherein said propylene polymer is selected from the group consisting of an isotactic propylene homopolymer having an n-heptane-soluble fraction of less than about 15% by weight, a copolymer of ethylene and propylene comprising less than about 10% by weight of ethylene, and a copolymer of propylene with alpha-olefins having 4 to 8 carbon atoms comprising less than about 10% by weight of said alpha-olefins.

6. A biaxially oriented film as claimed in claim 1, wherein at least one of said additional layers comprises an antiblocking agent having an average particle size of about 2 to about 5 μm.

7. A biaxially oriented film as claimed in claim 1, wherein at least one of said additional layers comprises polydimethylsiloxane.

8. The biaxially oriented film as claimed in claim 1, wherein said additional layers each have a thickness of less than about 0.5 μm.

9. The polypropylene film as claimed in claim 1, wherein the resin is selected from the group consisting of petroleum resins, styrene resins, cyclopentadiene resins, and terpene resins.

10. A biaxially oriented film as claimed in claim 1, wherein at least one of said additional layers comprises a propylene homopolymer or propylene copolymer comprising at least 90 weight % of propylene based on the weight of the copolymer.

11. A biaxially oriented film as claimed in claim 10, wherein at least one of said additional layers comprises a resin having a softening point of about 130° to about 180° C.

12. A biaxially oriented film as claimed in claim 1, wherein said at least one additional layer comprises two layers, one on either side of the base layer.

13. A biaxially oriented film as claimed in claim 12, wherein said additional layers are the two outer layers of said biaxially oriented film.

14. A biaxially oriented film as claimed in claim 1, produced by a process comprising the steps of:
 i) coextruding through a slot die the individual layers of the film so as to produce a multilayer film,
 ii) solidfying said multilayer film by chilling, and
 iii) orienting said multilayer film by stretching in the longitudinal and transverse directions, such that the film is imparted with isotropic properties in each direction.

15. A biaxially oriented film as claimed in claim 14, wherein the stretching ratio in the longitudinal direction is about 6 to about 9 and the stretching ratio in the transverse direction is about 6 to about 9.

16. A biaxially oriented film as claimed in claim 14, wherein said at least one additional layer comprises the two outer layers of said multilayer film.

17. A biaxially oriented film as claimed in claim 16, wherein after said step iii), at least one of said outer layers are corona or flame treated so as to improve the printability of said multilayer film.

18. A biaxially oriented film as claimed in claim 1, wherein the additional layer has been corona treated.

19. A biaxially oriented film as claimed in claim 1, wherein the elongation at break of the film is less than 90%, both in the machine direction and in the direction extending perpendicularly thereto and wherein the differences between values of elongation at break in the said directions is less than about 10%.

20. A biaxially oriented film as claimed in claim 1, wherein the film has a gloss of more than about 110 and a haze of less than about 2%.

* * * * *